US008432506B2

(12) United States Patent
Qian

(10) Patent No.: US 8,432,506 B2
(45) Date of Patent: Apr. 30, 2013

(54) LIQUID CRYSTAL DISPLAY DEVICE AND RELATED REPAIRING METHODS

(75) Inventor: Dong Qian, Jiangsu Provience (CN)

(73) Assignee: Chimei Innolux Corporation (TW)

( * ) Notice: Subject to any disclaimer, the term of this patent is extended or adjusted under 35 U.S.C. 154(b) by 458 days.

(21) Appl. No.: 12/685,276

(22) Filed: Jan. 11, 2010

(65) Prior Publication Data

US 2010/0188594 A1 Jul. 29, 2010

(30) Foreign Application Priority Data

Jan. 23, 2009 (TW) ................................ 98102993 A

(51) Int. Cl.
*G02F 1/1333* (2006.01)
(52) U.S. Cl.
USPC ........................................................... 349/54
(58) Field of Classification Search ................ 349/54
See application file for complete search history.

(56) References Cited

U.S. PATENT DOCUMENTS

| 5,303,074 | A | * | 4/1994 | Salisbury | ......................... | 349/55 |
| 5,608,245 | A | * | 3/1997 | Martin | ........................... | 257/291 |
| 5,995,178 | A | * | 11/1999 | Fujikawa et al. | ................ | 349/55 |
| 6,111,558 | A | | 8/2000 | Jeung et al. | | |
| 6,320,630 | B1 | * | 11/2001 | Yamashita et al. | ............. | 349/42 |
| 6,380,992 | B1 | | 4/2002 | Lee | | |
| 7,522,227 | B2 | * | 4/2009 | Kim | ................................ | 349/54 |
| 2001/0020988 | A1 | * | 9/2001 | Ohgiichi et al. | ................ | 349/54 |
| 2001/0028418 | A1 | * | 10/2001 | Ozaki et al. | ...................... | 349/54 |
| 2004/0233344 | A1 | * | 11/2004 | Ohgiichi et al. | ................ | 349/40 |
| 2007/0103423 | A1 | * | 5/2007 | Tsai et al. | ...................... | 345/100 |
| 2008/0225196 | A1 | * | 9/2008 | Kim | ................................ | 349/54 |

FOREIGN PATENT DOCUMENTS

| CN | 1648728 | | 8/2005 |
| CN | 1787217 | | 6/2006 |
| CN | 1825168 | | 8/2006 |
| JP | 07013197 | A * | 1/1995 |
| TW | 200627030 | | 8/2006 |
| TW | 200827888 | | 7/2008 |

OTHER PUBLICATIONS

TIPO Office Action dated Sep. 21, 2012 from corresponding application No. 098102993.
TIPO Office Action dated Dec. 24, 2012 from corresponding application No. TW 098102993.
SIPO Office Action and Search Report dated Dec. 28, 2012 from corresponding application No. CN 200910000975.3.

* cited by examiner

*Primary Examiner* — K. Cyrus Kianni
(74) *Attorney, Agent, or Firm* — Lowe Hauptman Ham & Berner, LLP

(57) ABSTRACT

The present invention provides a liquid crystal display device and methods for repairing defects in the same. The liquid crystal display includes a display driver, an active area of the display panel, and a first signal line. The first signal line, connected to the display driver and the active area, has a defect. A repair line is disposed above the first signal line between the display driver and the active area, wherein the repair line and the first signal line have at least two overlaps without electrical connection there between. The repair line is continuous between two overlaps which are located at the two sides of the defect. Then the repair line and the first signal line are shorted at the two overlaps. And the first signal line is cut at the locations between the defect and the two overlaps.

10 Claims, 7 Drawing Sheets

LIQUID CRYSTAL DISPLAY DEVICE AND RELATED REPAIRING METHODS

CROSS-REFERENCE TO RELATED APPLICATIONS

This application claims the right of priority based on Taiwan Patent Application No. 98102993 entitled "LIQUID CRYSTAL DISPLAY DEVICE AND RELATED REPAIRING METHODS", filed on Jan. 23, 2009, which is incorporated herein by reference and assigned to the assignee herein.

FIELD OF INVENTION

The present invention relates to a LCD device and a method for repairing the LCD device, and more particularly to a LCD device having a repair line to repair a defect on a signal line connecting the display driver with the active area of the LCD device.

BACKGROUND OF THE INVENTION

Conventionally, unintentional shorts or opens happened on the signal lines between the display driver and the active area (where the LCD has pixels) cause defects and thus raise the manufacture cost.

As shown in FIG. 1, a conventional LCD device 100 has a plurality of signal lines 106 connecting the display driver 102 with the active area 104 on the panel 101. If one signal line 106 has a defect, then the signal generated from the display driver 102 cannot reach the active segment 1042 of the active area 104 via the signal line 106. Therefore the active segment 1042 cannot display normally.

Conventionally, auxiliary lines 108a and 108b (also called "race tracks") would be adopted into the LCD device 100. In the beginning, auxiliary lines 108a and 108b cross over the signal lines 106 but do not have a contact with the signal lines 106. Auxiliary lines 108a and 108b may have electrical connection to each other via the display driver 102.

When one signal line 106 has a defect DFA below the auxiliary line 108b (i.e., between the auxiliary line 108b and the active area 104), firstly the signal line 106 is cut at two sides of the defect DFA (as shown in FIG. 1), to electrically isolate the defect DFA. Then, the auxiliary line 108a and the signal line 106 are welded at the point W1, so the signal from the display driver 102 would be transmitted via the upper part of the signal line 106 and then would go back to the display driver 102 via the auxiliary line 108a. Then the display driver 102 will re-transmit the signal to the auxiliary line 108b, which is further connect to another display driver 103 on the other side of the panel 101, for example. Therefore, the signal can make a detour and feed into the active segment 1042 from the other side of the panel 101.

However, this conventional repair method could only help the signal line 106 to solve the defect DFA in FIG. 1 or defects occurring between the auxiliary line 108b and the active area 104, but it is useless for the defect DFB in FIG. 1 or defects occurring between the display driver 102 and the auxiliary line 108a.

In light of the deficiency motioned above, it is desired to have a novel LCD device and a method for the LCD device to repair the defects of signal lines connecting the display driver and the active area, and more particularly to repair the defects happening between the display driver and the conventional auxiliary line.

SUMMARY OF THE INVENTION

One aspect of the present invention is to provide a repairing method for a LCD device to repair the defect of the signal line connecting the display driver to the active area, or to repair the defects happening between the display driver and the conventional auxiliary line. Particularly, a repair line and the signal line having s defect are shorted at two sides of the defect. Meanwhile, the signal line is cut between the defect and the repair line.

Another aspect of the present invention is to provide a LCD device, including a substrate, a first metal layer, and a second metal layer, wherein the first metal layer and the second metal layer are isolated from each other. The first metal layer forms a signal line, and the second metal layer forms a repair line. The signal line and the repair line have at least two overlaps, and the repair line is continuous between the overlaps.

In one embodiment, disclosed is a method for repairing a LCD device. The LCD device has a display driver, an active area, and a first signal line. The first signal line connects the display driver to the active area and has a defect thereon. The steps of the repairing method includes: (a) disposing a repair line above the first signal line between the display driver and the active area, wherein the repair line and the first signal line have at least two overlaps without electrical connection to each other, wherein the two overlaps are located at the two sides of the defect and the repair line is continuous between the two overlaps; and (b) shorting the repair line and the first signal line at the two overlaps, and cutting the first signal lines locating between the defect and the overlaps.

In another embodiment, disclosed is an LCD device, including a display driver, a substrate, a first metal layer, and a second metal layer. The display driver generates signals for the pixels on the active area of the substrate. The first metal layer is placed above the substrate and forms a first signal line to connect the display driver to the active area. The second metal layer is placed above the first metal layer and forms a repair line. The repair line and the first signal line have at least two overlaps and the repair line is continuous between the two overlaps.

The above and others objects, features and advantages of the present invention will become more apparent from the following detailed description in conjunction with the accompanying drawings.

BRIEF DESCRIPTION OF THE DRAWINGS

The invention will now be further described by way of example only with reference to the accompany drawings in which.

DETAILED DESCRIPTION OF THE PREFERRED EMBODIMENTS

The following embodiments of the present invention provide a repairing method for a LCD device to repair the defect (e.g., an unintentional short or open) of the signal line connecting the display driver to the active area, or to repair the defect happening between the display driver and the conventional auxiliary line. The invention will now be further described by way of example only with reference to the accompany FIGS. 2a-4.

Figure 2A:
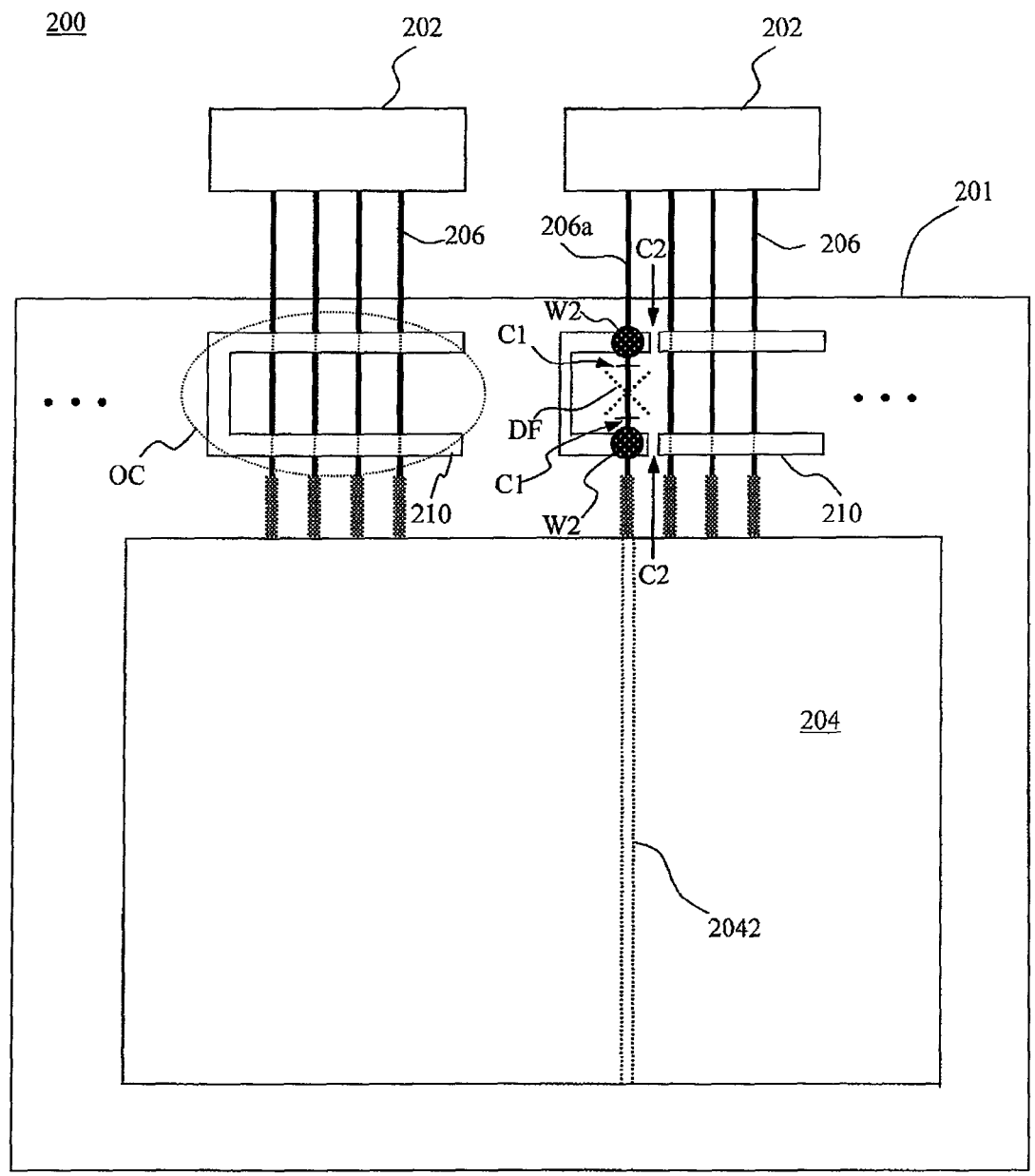
FIGS. 2a, 2c and 2d show a LCD device according to an embodiment of the present invention.
Figure 2B:
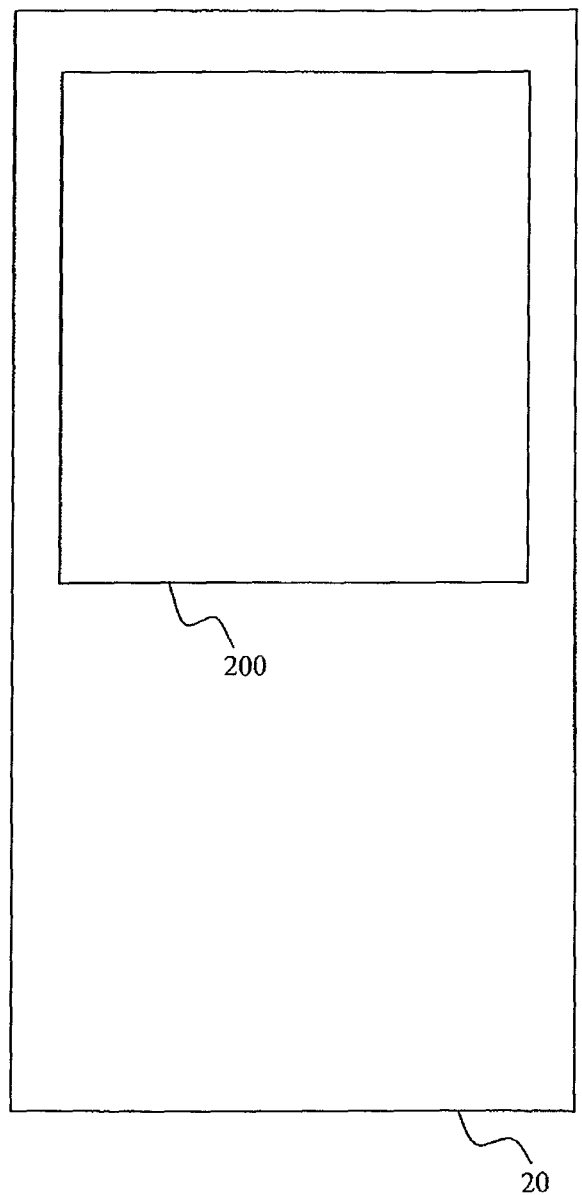
FIG. 2b show an electronic device according to an embodiment of the present invention.

FIG. 2a shows an LCD device 200, which may be applied to an electronic device 20 in FIG. 2b, according to an embodiment of the present invention. The electronic device 20 could be a TV, a mobile phone, a digital camera, a personal digital assistant (PDA), a notebook computer, a desktop computer, a television, a global positioning system (GPS), a car media player, an avionics display, a digital photo frame, a portable video player, etc.

As shown in FIG. 2a, the LCD device 200 includes a display driver 202, an active area 204 on a panel 201, a plurality of signal lines 206 and repair lines 210. The active area 204 contains a plurality of LC units (or pixels) arranged in an array to display images for the LCD device 200. The display driver 202, for generating control signals or data signals, could be disposed on the substrate (e.g., the substrate 212 shown in FIG. 2c or 2d) or on a circuit board (not shown) outside the substrate. Signal lines 206 connect the display driver 202 to the active area 204. In this embodiment, each repair line 210 is formed in a "C shape" or an "O shape" (not shown). Moreover, a repair line 210 and a signal line have at least two overlaps, and the repair line 210 is continuous between these two overlaps. Note that before the repair, the repair line 210 crosses over the signal lines 206, where the signal lines 206 under the repair line 210 is illustrated as dashes. Therefore, the repair line 210 and the signal lines 206 have no electrical connection to each other, so the signals from the display driver 202 could not be transmitted to the repair line 210 before the repair, which will be detailed later.

Figure 2C:
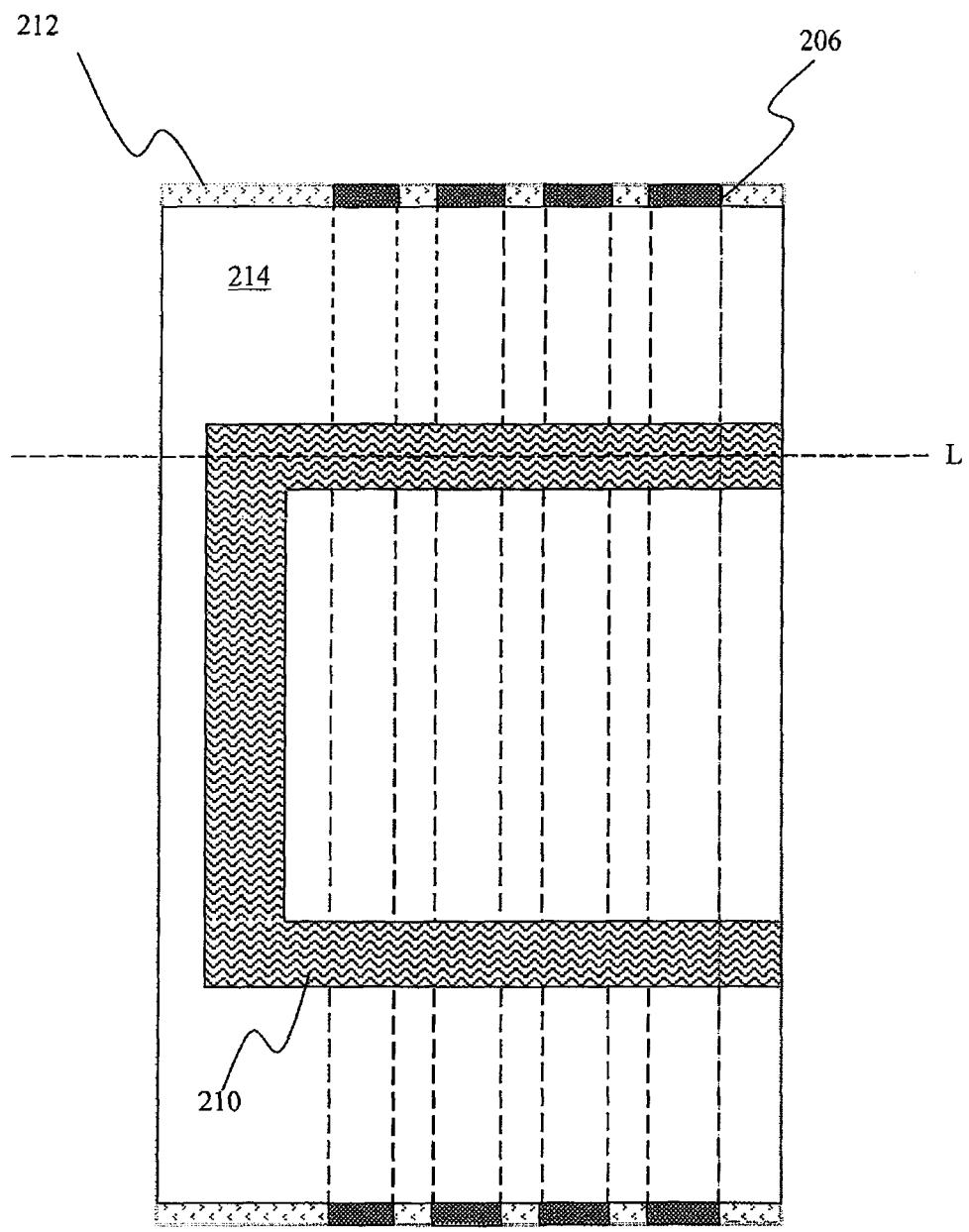
Figure 2D:
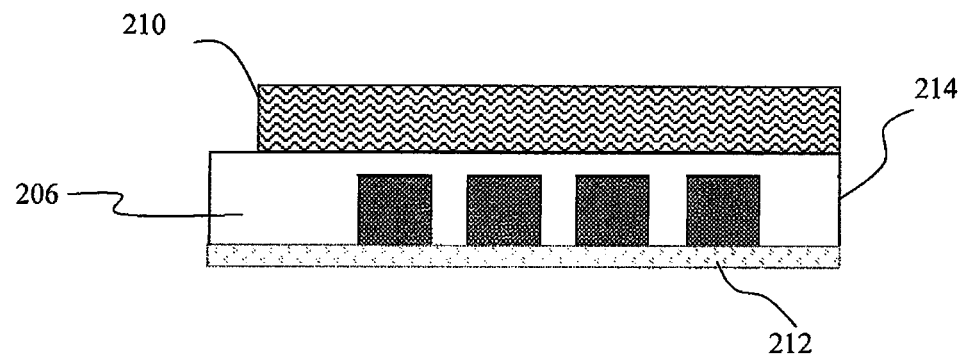

FIG. 2c further show the side view of the area OC of the LCD device 200 in FIG. 2a, and FIG. 2d is the cross section corresponding to the line L in FIG. 2c. As shown, the panel 201 has a substrate 212, which could be a glass substrate or any other substrates for conventional LCD devices. There is a dielectric layer 214 between the signal lines 206 formed with a first metal layer and the repair lines 210 formed with a second metal layer. The signal lines 206 are electrically isolated from the repair lines 210. For example, materials for the signal lines 206 (or the first metal layer) could be Al/Md/Mo, and materials for the repair lines 210 (or the second metal layer) could be Mo/Al/Mo.

Now refer back to FIG. 2a for the details of the repair. As shown, the signal line 206a, corresponding to an active segment (or a column or a row) 2042 on the active area 204, has a defect DF. Those skilled in the art may use some known method to locate the defect DF, or to determine if the defect DF occurs between the active area 204 and the display driver 202.

Notably, in the embodiment illustrated in FIG. 2a, the repair line 210 is disposed between the active area 204 and the display driver 202 and crosses over the signal lines 206. Particularly, the signal line 206a having a defect can be repaired when its defect DF is surrounded or enclosed by the C-shape or O-shape (not shown) repair line 210.

As shown in FIG. 2a, the signal line 206a has the defect DF in an area surrounded by the C-shape repair line 210, i.e., between the two overlaps of the signal line 206a and the repair line 210. The repair begins with shorting the repair line 210 and the signal line 206a by welding them together at the two sides of the defect DF (preferably at the two overlaps mentioned above, as shown as the welding points W2) and keeping the repair line 210 continuous between these welding points W2. Then the signal line 206a having a defect is cut at the locations C1 between the defect DF and the welding points W2.

Preferably, an energy beam (such as a gas laser, a liquid laser, a solid state laser, or a semiconductor laser) is utilized to short or weld the repair line 210 and the signal line 206a at the overlaps (i.e., the welding points W2). The energy beam melts and welds together the repair line 210 formed with the second metal layer and the defected signal line 206a formed with the first metal layer. After that, the signals from the display driver 202 can be transmitted to the active area 204 through the signal line 206a and the repair line 210. In this manner, the repair line 210 repairs the defect DF of the signal line 206a.

Also, another energy beam (such as a gas laser, a liquid laser, a solid state laser, or a semiconductor laser) could be utilized to cut the signal line 206a at the location(s) between the defect DF and any one or both of the overlaps (i.e., between the defect DF and the welding points W2). Therefore, cuts C1 are formed at the both sides of the defect DF, to isolate the defect DF from the remainders of the signal line 206a, which may be still useful after the repair to transmit the signals from the display driver 202.

In addition, the repair line 210 has overlaps not only with the signal line 206a having a defect but also with other signal lines 206, such as signal lines 206 next to the signal line 206a. To avoid the neighboring signal lines 206's interference or unintentional short with the repaired signal line 206a, the repair line 210 may be further cut, using the energy beam for example, at the location(s) between the signal line 206a and the neighboring signal lines 206, as shown as the cuts C2.

Figure 3:
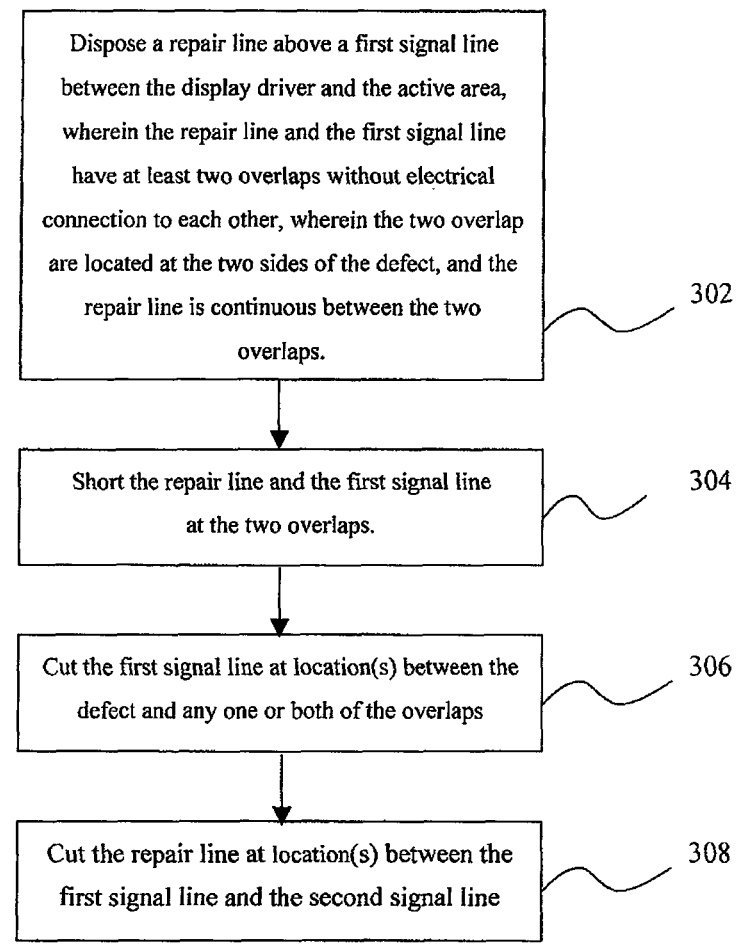
FIG. 3 is a flowchart showing the repairing method according to an embodiment of the present invention.

FIG. 3 is a flowchart showing the repairing method according to an embodiment of the present invention and could be applied to the LCD device 200, having a signal line 206a, as shown in FIG. 2a. In the step 302, a repair line 210 is disposed above a first signal line 206a between the display driver 202 and the active area 204, wherein the repair line 210 and the first signal line 206a have at least two overlaps without electrical connection to each other. Particularly, the two overlaps are located at the two sides of the defect DF, and the repair line 210 is continuous between the two overlaps. Then the step 304 is shorting the repair line 210 and the first signal line 206a at the two overlaps. Next in the step 306, the first signal line 206a is cut at a location between the defect DF and any one of the overlaps. In the step 308, the repair line 210 is further cut between the first signal line 206a and a second signal line 206. By the steps mentioned above, the signal line 206a is repaired, and the signal from the display driver 202 can be transmitted to the active area 204 again regardless of the defect DF.

Figure 1:
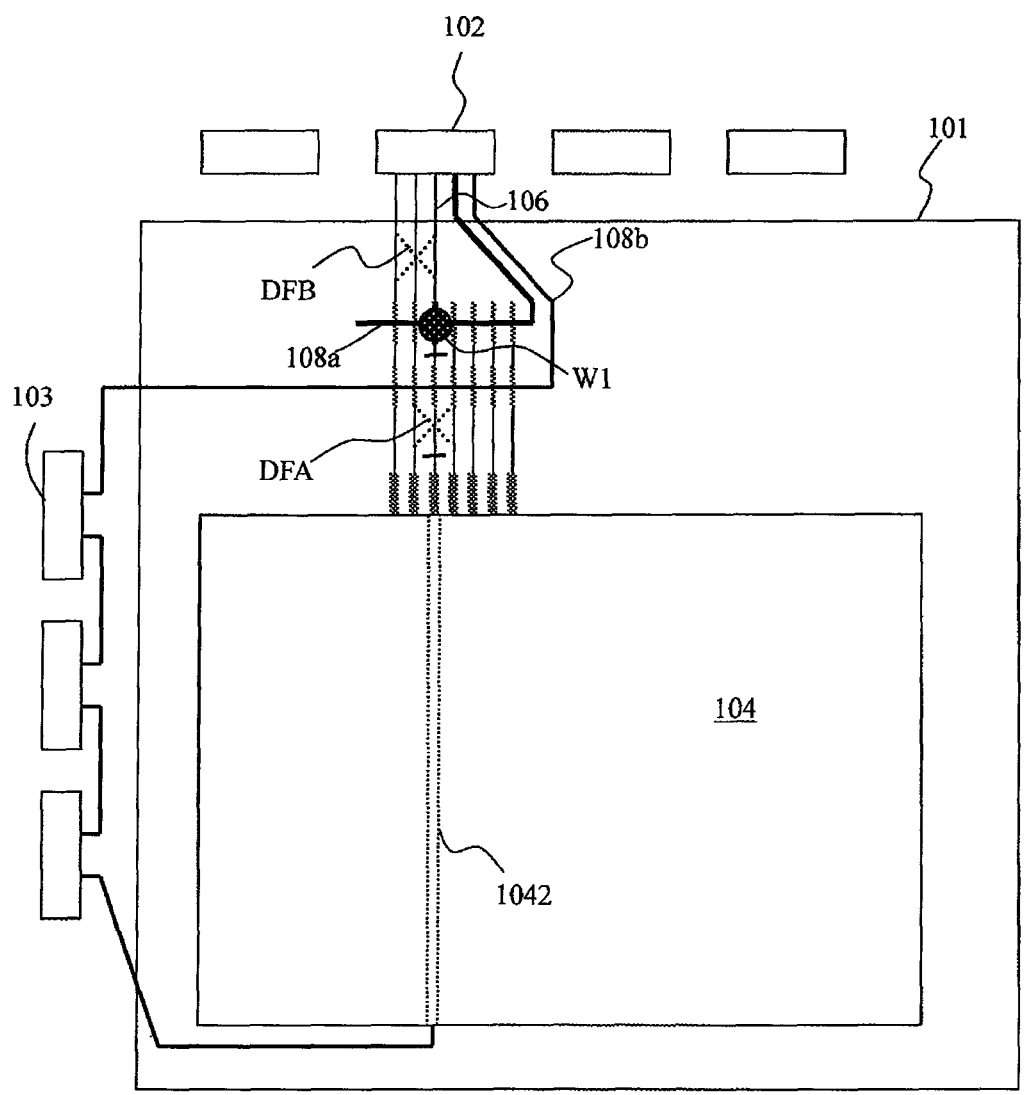
FIG. 1 shows a conventional LCD device.
Figure 4:
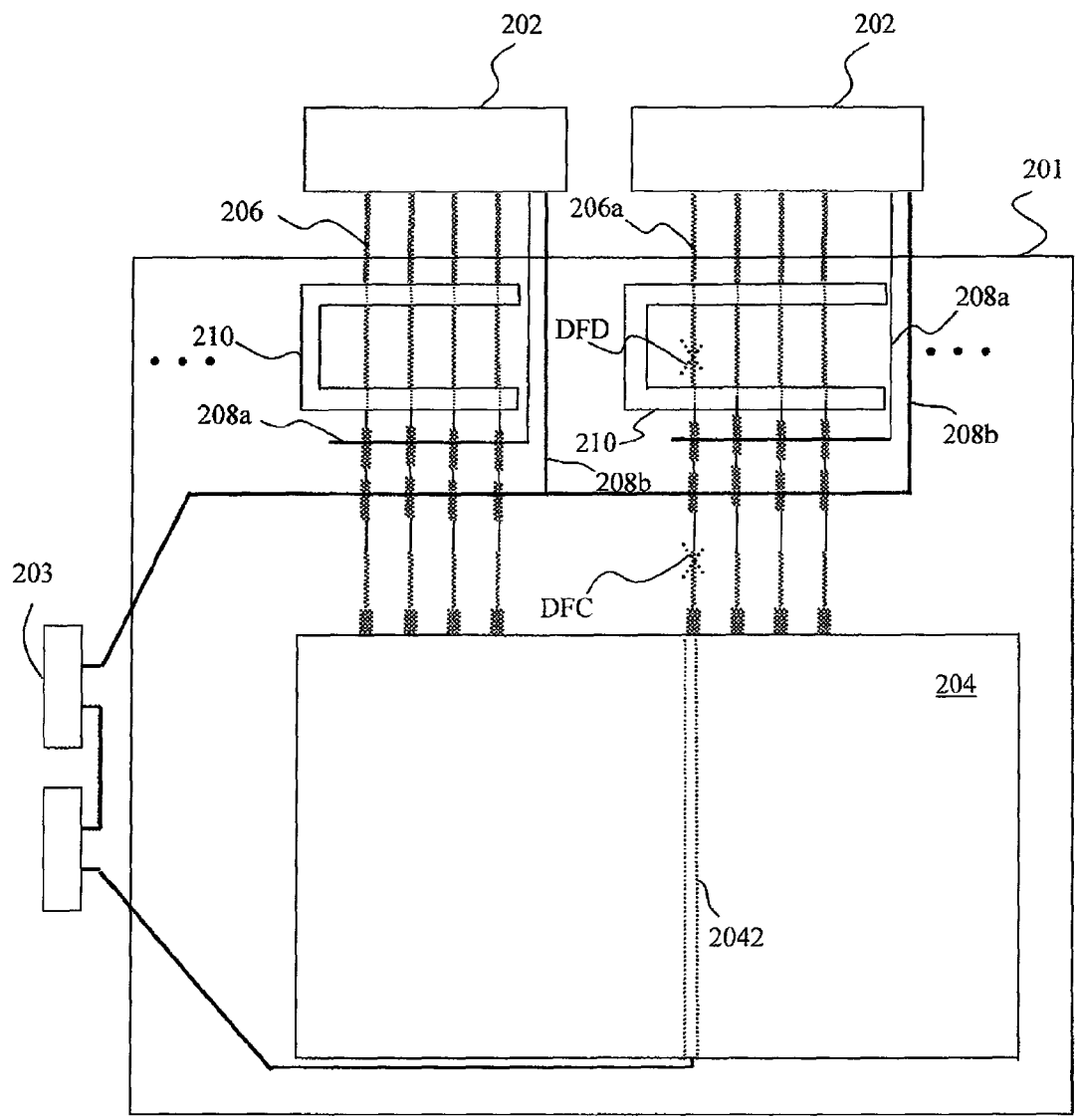
FIG. 4 shows a LCD device according to another embodiment of the present invention.

FIG. 4 shows a LCD device 250 according to another embodiment of the present invention. The LCD device 250 has a plurality of display drivers 202, 203, an active area 204 on a panel 201, a plurality of signal lines 206, auxiliary lines 208a and 208b, and a plurality of repair lines 210. Compared to the embodiment shown in FIG. 2a, the LCD device 250 additionally has the auxiliary lines 208a and 208b, also referred to as "race track". In this embodiment, if the signal line 206a has a defect DFC between the display driver 210 and the auxiliary line 208a, a repairing method illustrated in FIG. 2a and FIG. 3 could be applied here. Meanwhile, a defect DFD between the auxiliary line 208b and the active area 204 could be cured by the auxiliary line 208a and 208b, as demonstrated in FIG. 1. Therefore, the embodiment shown in FIG. 4 can repair the signal line 206a having a defect if the defect occurs between the display driver 210 and the auxiliary line 208a or between the auxiliary line 208b and the active area 204.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

I claim:

1. A method of repairing a liquid crystal display (LCD) device without affecting a pixel aperture ratio of said LCD, said LCD device comprising a display driver, an active area including pixels, and a first signal line, said first signal line connecting said display driver with said active area, said first signal line having a defect outside the active area, said method comprising:

disposing a repair line above the first signal line between said display driver and said active area, wherein
said repair line and said first signal line have at least two crossovers without electrical connection to each other,
said two crossovers are located on opposite sides of said defect that is outside the active area, and
said repair line is continuous between said two crossovers;

shorting said repair line and said first signal line at said two crossovers; and cutting said first signal line at a location between said defect and any one of said crossovers;

cutting a first or second section of the repair line at a location between the first signal line having the defect and another signal line adjacent to the first signal line having the defect.

2. The method according to claim 1, said LCD device further comprising a second signal line connecting said display driver with said active area and disposed next to said first signal line, said repair line and said second signal line also having at least two crossovers without electrical connection to each other, said method further comprising:

maintaining electrical isolation between said repair line and said second signal line.

3. The method according to claim 2, wherein said maintaining comprises:
cutting said repair line at a location between said first signal line and said second signal line.

4. The method according to claim 3, wherein said maintaining comprises:
utilizing an energy beam to cut said repair line.

5. The method according to claim 1, wherein said shorting comprises:
utilizing an energy beam to short said repair line and said first signal line.

6. A method of repairing a liquid crystal display (LCD) device, the LCD device comprising a display driver, an active area including pixels, and more than two signal lines connecting the display driver with the active area, said method comprising:

disposing a repair line over the signal lines and outside the active area, the repair line comprising
a first section extending continuously across the signal lines, the first section and each of the signal lines having a first crossover without electrical connection to each other,
a second section extending continuously across the signal lines, the second section and each of the signal lines having a second crossover without electrical connection to each other, and
a third section connecting the first and second sections; and upon detection of a defect on one of the signal lines between the corresponding first and second crossovers,
shorting the first and second sections of the repair line to the signal line having the defect at the corresponding first and second crossovers; and
cutting the signal line having the defect at a location between the defect and any one of the corresponding first and second crossovers;

cutting the first or second section of the repair line at a location between the signal line having the defect and another signal line adjacent to the signal line having the defect.

7. The method according to claim 6, further comprising:
maintaining electrical isolation between the repair line and the other signal lines.

8. The method according to claim 6, wherein said cutting comprises:
utilizing an energy beam to cut the repair line.

9. The method according to claim 6, wherein said shorting comprises:
utilizing an energy beam to short the repair line and the signal line having the defect.

10. The method according to claim 6, wherein the defect is outside the active area.

* * * * *